(12) United States Patent
Yin

(10) Patent No.: US 8,611,532 B2
(45) Date of Patent: Dec. 17, 2013

(54) MANAGING MEDIA CONTENT DECRYPTION KEYS IN ENCRYPTED MEDIA CONTENT DISTRIBUTION SYSTEMS AND METHODS

(75) Inventor: Fenglin Yin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 78 days.

(21) Appl. No.: 13/282,879

(22) Filed: Oct. 27, 2011

(65) Prior Publication Data

US 2013/0108042 A1 May 2, 2013

(51) Int. Cl.
*H04N 7/167* (2011.01)
*H04K 1/00* (2006.01)
*H04L 9/00* (2006.01)

(52) U.S. Cl.
USPC ............ 380/255; 380/223; 380/228; 380/277

(58) Field of Classification Search
USPC .................................. 380/255, 223, 228, 277
See application file for complete search history.

(56) References Cited

U.S. PATENT DOCUMENTS

| | | | | |
|---|---|---|---|---|
| 7,886,160 | B2 * | 2/2011 | Morita et al. | 713/193 |
| 8,306,230 | B2 * | 11/2012 | Takakusu et al. | 380/286 |
| 2003/0097655 | A1 * | 5/2003 | Novak | 725/31 |
| 2004/0177257 | A1 * | 9/2004 | Fujinawa et al. | 713/189 |
| 2006/0140410 | A1 * | 6/2006 | Aihara | 380/273 |
| 2008/0075284 | A1 * | 3/2008 | Ellison et al. | 380/201 |
| 2012/0057697 | A1 * | 3/2012 | Holtmanns et al. | 380/42 |
| 2012/0216038 | A1 * | 8/2012 | Chen et al. | 713/168 |

* cited by examiner

*Primary Examiner* — Mohammad W Reza

(57) ABSTRACT

Exemplary systems and methods for managing media content decryption keys in encrypted media content distribution systems and methods are described. An exemplary method includes a user device 1) accessing a set of decryption keys, 2) storing the set of decryption keys in local memory, 3) accessing an encrypted media content program, 4) switching from accessing the encrypted media content program to accessing another encrypted media content program, the another encrypted media content program temporally aligned with the encrypted media content program, 5) using a decryption key included in the set of decryption keys stored in the local memory to decrypt the encrypted media content program before the switching is performed, and 6) using another decryption key included in the set of decryption keys stored in the local memory to decrypt the another encrypted media content program after the switching is performed. Corresponding systems and methods are also disclosed.

25 Claims, 16 Drawing Sheets

MANAGING MEDIA CONTENT DECRYPTION KEYS IN ENCRYPTED MEDIA CONTENT DISTRIBUTION SYSTEMS AND METHODS

BACKGROUND INFORMATION

In certain media content distribution systems, media content is encrypted before being distributed over a media content distribution network. The encryption of the media content, which may be required by owners and/or providers of the media content, is designed to protect the media content from unauthorized access and/or use.

Access to and/or use of the encrypted media content may be controlled through selective distribution of decryption keys configured to be used to decrypt the encrypted media content. A distributor of encrypted media content typically provides decryption keys only to parties authorized to access and/or use the encrypted media content (e.g., to paying customers).

The encryption and decryption of media content imposes significant overhead costs on a media content distribution system. For example, before a media content access device that has accessed encrypted media content can present back the media content for experiencing by a user, the media content access device must retrieve and use appropriate decryption keys to decrypt the encrypted media content. In conventional media content distribution systems, such a media content access device dynamically requests and receives, from a service provider, an individual decryption key "on-the-fly" and/or "as needed" for use to decrypt particular encrypted media content. In certain media content distribution systems, however, such dynamic retrieval of a decryption key imposes undesirable inefficiencies, delays, and/or overhead costs.

To illustrate, when a user of a media content access device decides to switch from accessing one media content program to access another media content program (e.g., by changing channels from one media content channel to another media content channel), the user provides appropriate input to the media content access device, which then performs one or more operations to effectuate the requested switch. Unfortunately, the switch may be delayed, less efficient, and/or costly because of undesirable inefficiencies, delays, and/or overhead costs imposed by the media content access device having to dynamically and individually retrieve a new decryption key, which is needed to decrypt the other media content program, from a remote source at the time of the switch and/or in response to the switch request. The delay, inefficiencies, and/or costs associated with effectuating such a switch in accordance with conventional technologies may degrade user experiences and/or be otherwise costly and/or detrimental to operators of media content distribution systems.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems and methods for managing media content decryption keys in encrypted media content distribution systems and methods are described herein. In the disclosed exemplary systems and methods, decryption keys configured to be used to decrypt encrypted media content programs may be distributed as sets of decryption keys. By distributing decryption keys as sets of decryption keys, such as sets of decryption keys configured to be used to decrypt encrypted temporally aligned media content programs as described herein, certain inefficiencies, delays, and/or overhead costs imposed by conventional "on-the-fly" and/or "as needed" retrievals of individual decryption keys for use to decrypt particular encrypted media content programs may be reduced or eliminated. This may, in turn, promote improved user experiences with an encrypted media content distribution system.

To illustrate, when a user of a user device configured to access encrypted media content distributed by a media content provider subsystem decides to switch from accessing one encrypted media content program to access another encrypted media content program (e.g., by changing channels from one media content channel to another media content channel), the user provides appropriate input to the user device, which then performs one or more operations to effectuate the requested switch. Instead of having to dynamically retrieve a new individual decryption key for the other encrypted media content program from a remote source "on-the-fly" in conjunction with the switch e.g., (at the time of the switch and/or in response to the switch request), the user device is able to access the new decryption key from a local memory of the user device because the new decryption key is included in a set of decryption keys that has already been accessed and stored by the user device. This allows the new decryption key to be accessed more efficiently, quickly, and/or inexpensively from local memory for use to decrypt the other encrypted media content program. Accordingly, the length of time and/or costs incurred to effectuate the switch may be reduced compared to having to dynamically and individually retrieve the new decryption key "on-the-fly" and/or "as needed" from a remote source in a conventional media content distribution system.

These and/or other benefits provided by the disclosed exemplary systems and methods will be made apparent herein. Examples of media content distribution systems and methods and managing media content decryption keys in the media content distribution systems and methods will now be described in reference to the accompanying drawings.

Figure 1:
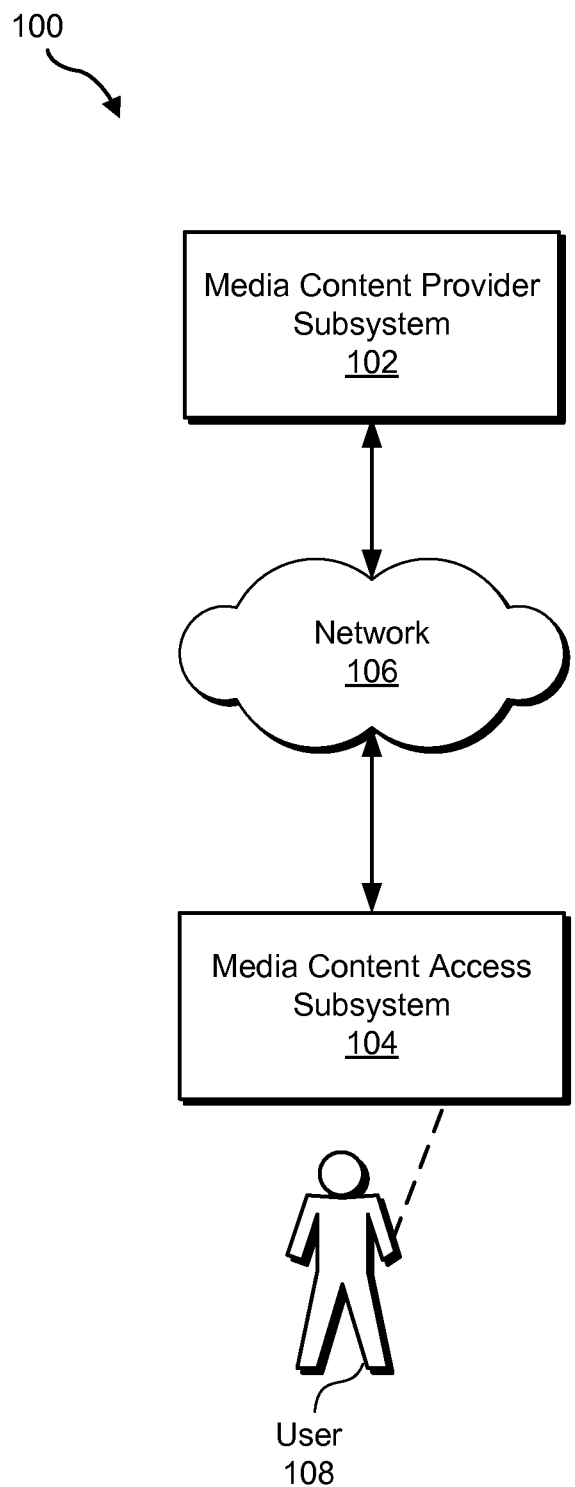
FIG. 1 illustrates an exemplary media content distribution system according to principles described herein.

FIG. 1 illustrates an exemplary media content distribution system 100 ("system 100") that includes a media content provider subsystem 102 ("provider subsystem 102") and a media content access subsystem 104 ("access subsystem 104") configured to communicate with one another by way of a network 106. Provider subsystem 102 may include or be implemented by one or more computing devices of a server-side computing system controlled by (e.g., operated by) a service provider such as a media content distribution service provider. Access subsystem 104 may include or be implemented by one or more client-side computing devices controlled by (e.g., operated by) a user 108 (e.g., an end user of one or more services provided by provider subsystem 102). Examples of such devices, which may be referred to as "user devices" herein, may include, without limitation, a personal computer, a mobile phone device, a smart phone, a tablet computer, a set-top box device, a digital video recorder ("DVR") device, a gaming device, and any other computing device or combination of computing devices configured to access a service and/or media content provided by provider subsystem 102.

Provider subsystem 102 and access subsystem 104 may communicate using any remote communications technologies suitable to support distribution of and access to media content provided by provider subsystem 102. Examples of such communication technologies include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), Hypertext Transfer Protocol ("HTTP"), Hypertext Transfer Protocol Secure ("HTTPS"), Ethernet, wireless communications technologies, media content transport technologies, media content streaming technologies, other suitable communications technologies, and any combination or sub-combination thereof.

Provider subsystem 102 may distribute, and access subsystem 104 may access, media content by way of network 106. Network 106 may include any network or combination of networks provided by one or more appropriately configured network devices (and communication links thereto) and over which communications and data (e.g., media content data and/or decryption key data) may be transported between provider subsystem 102 and access subsystem 104. For example, network 106 may include, but is not limited to, a mobile phone network (e.g., a cellular phone network, a 3G network, a 4G network, etc.), a satellite media network (e.g., a broadcasting network, a terrestrial media broadcasting network, etc.), a media content distribution network (e.g., a subscriber television network, a media broadcasting, multicasting, and/or narrowcasting network, etc.), a telecommunications network, the Internet, the World Wide Web, a wide area network, any other network capable of transporting communications and data between provider subsystem 102 and access subsystem 104, and/or any combination or sub-combination thereof.

Provider subsystem 102 may be configured to preprocess and distribute encrypted media content over network 106 for access by access subsystem 104. Provider subsystem 102 may be further configured to selectively provide decryption keys over network 106 for access and use by access subsystem 104 to decrypt the media content.

Figure 2:
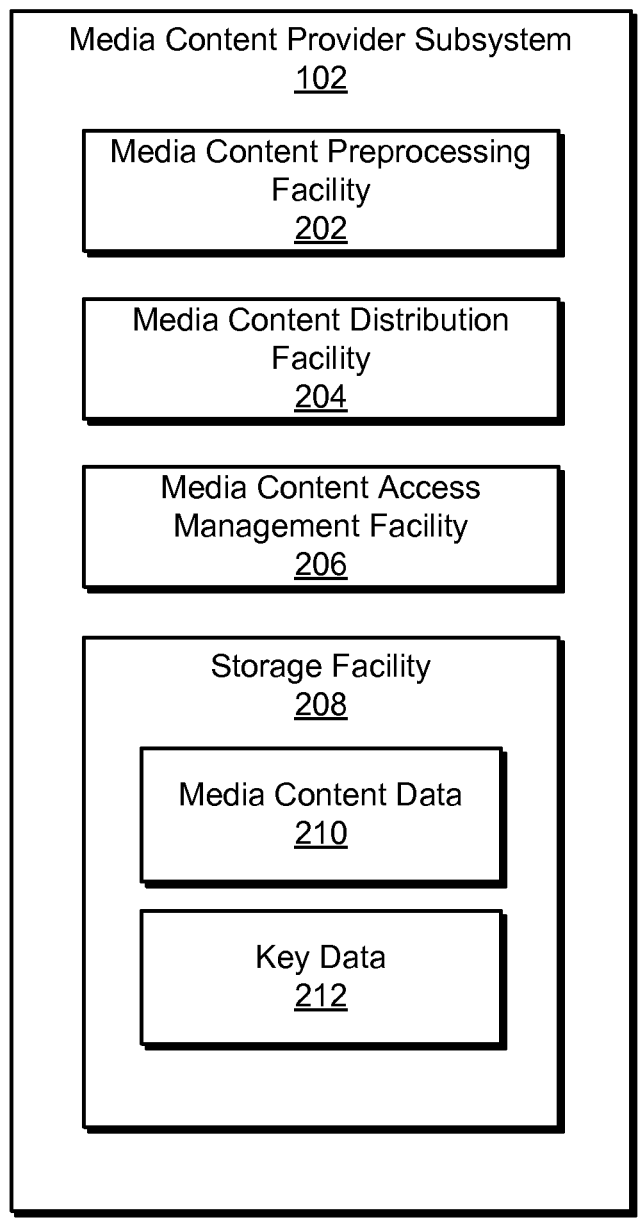
FIG. 2 illustrates exemplary components of a media content provider subsystem according to principles described herein.

FIG. 2 illustrates exemplary components of provider subsystem 102. As shown, provider subsystem 102 may include a media content preprocessing facility 202 ("preprocessing facility 202"), a media content distribution facility 204 ("distribution facility 204"), a media content access management facility 206 ("access management facility 206"), and a storage facility 208, which may be in communication with one another using any suitable communication technologies.

Preprocessing facility 202 may be configured to perform one or more preprocessing operations on media content prior to provider subsystem 102 distributing the media content over network 106. For example, preprocessing facility 202 may receive data representative of the media content from one or more sources (e.g., one or more content providers such as one or more providers of television programming), capture the media content (e.g., buffer, store, and/or otherwise process data representative of the media content), segment the media content (e.g., divide the media content into one or more encryption segments as described herein), and/or encrypt the media content. Preprocessing facility 202 may employ any suitable media content encryption technologies to encrypt the media content. After preprocessing facility 202 has encrypted the media content, preprocessing facility 202 may provide the encrypted media content to distribution facility 204 for distribution over network 106.

Distribution facility 204 may distribute the encrypted media content over network 106 for access by access subsystem 104. The distribution may be performed in any suitable way, including in any of the ways and using any of the media content distribution technologies described herein. For example, distribution facility 204 may be configured to broadcast, multicast, and/or narrowcast encrypted media content over network 106.

Access management facility 206 may be configured to manage keys configured to be used to encrypt and/or decrypt media content. In certain embodiments in which a key that is used to encrypt media content may also be used to decrypt the encrypted media content, the key may be referred to interchangeably as an "encryption key" or "decryption key." Access management facility 206 may be configured to generate and/or reserve one or more encryption keys for use by preprocessing facility 202 to encrypt media content.

Access management facility 206 may be further configured to selectively provide decryption keys over network 106 for access and use by access subsystem 104 to decrypt encrypted media content distributed by distribution facility 204. Access management facility 206 may communicate with distribution facility 204 to coordinate distribution of decryption keys at appropriate times and/or to appropriate user devices. Access management facility 206 may be configured to distribute decryption keys over network 106 using any suitable data communication technologies, including any of those disclosed herein.

As described herein, access management facility 206 may be configured to distribute decryption keys as sets of decryption keys. Exemplary sets of decryption keys and distribution of the sets of decryption keys are described in detail herein.

Storage facility 208 may be configured to maintain data generated and/or otherwise used by facilities 202-206. For example, storage facility 208 may be configured to maintain media content data 210 representative of media content processed by preprocessing facility 202 and/or distribution facility 204 and key data 212 representative of one or more keys managed by (e.g., generated and/or distributed by) access management facility 206. Storage facility 208 may maintain additional or alternative data (user entitlement data specifying the media content programs and/or channels that users are licensed to access), including any of the data disclosed herein.

Access subsystem 104 may be configured to access encrypted media content distributed over network 106 by provider subsystem 102. Access subsystem 104 may be further configured to access decryption keys selectively provided over network 106 by provider subsystem 102 and to use the decryption keys to decrypt the encrypted media content. Access subsystem 104 may be further configured to present the decrypted media content for experiencing by user 108.

Figure 3:
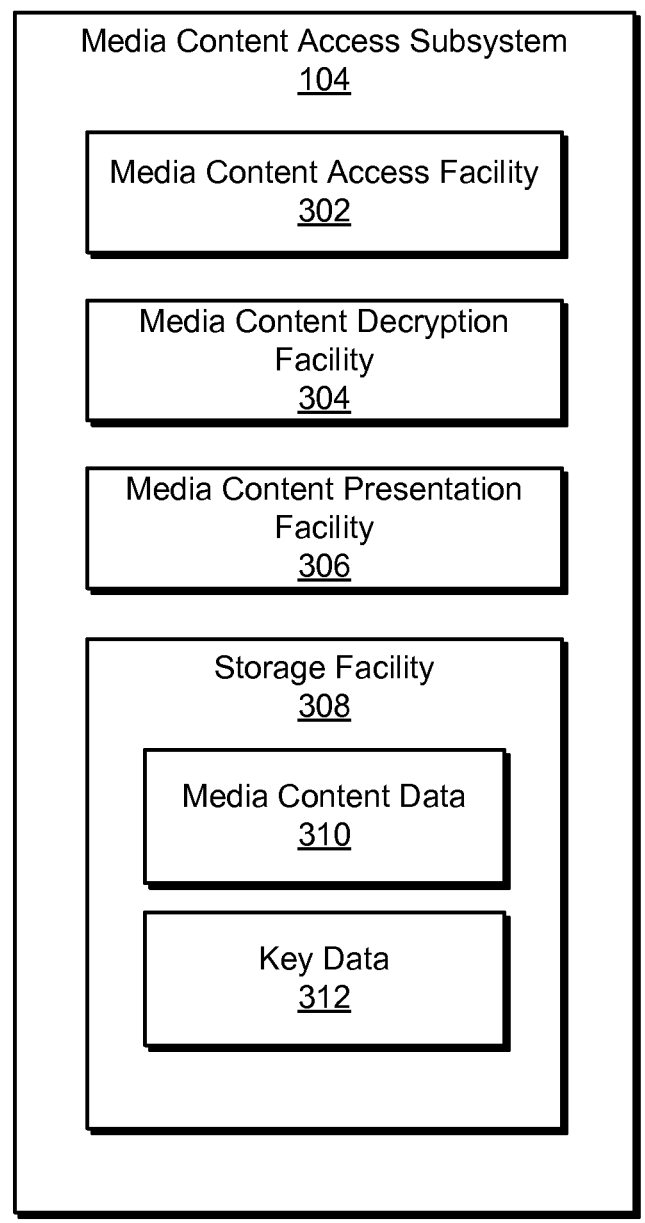
FIG. 3 illustrates exemplary components of a media content access subsystem according to principles described herein.

FIG. 3 illustrates exemplary components of access subsystem 104. As shown, access subsystem 104 may include a media content access facility 302 ("access facility 302"), a media content decryption facility 304 ("decryption facility 304"), a media content presentation facility 306 ("presentation facility 306"), and a storage facility 308, which may be in communication with one another using any suitable communication technologies.

Access facility 302 may be configured to access the encrypted media content distributed over network 106 by provider subsystem 102. Access facility 302 may access the encrypted media content in any suitable way. For example, access facility 302 may be configured to send a request to provider subsystem 102 requesting that particular media content be distributed by provider subsystem 102 to access subsystem 104. For instance, access facility 302 may request that provider subsystem 102 narrowcast stream particular media content to access subsystem 104 or that provider subsystem 102 add access subsystem 104 to a list of recipients of a multicast stream of particular media content. As another example, access facility 302 may be configured to select (e.g., tune a tuner to) a broadcast channel carrying particular media content in order to access the media content.

Decryption facility 304 may be configured to access decryption keys selectively provided over network 106 by provider subsystem 102. The decryption keys may be accessed by decryption facility 304 in any suitable way. For example, decryption facility 304 may be configured to request, periodically or in response to a predetermined event, decryption keys from provider subsystem 102, which may use information included in the request and/or other information to identify access subsystem 104 and/or user 108 and determine appropriate decryption keys to send to access subsystem 104 in response to the request. Alternatively, provider subsystem 102 may identify and push, periodically or in response to a predetermined event, appropriate decryption keys to access subsystem 104.

Decryption facility 304 may be configured to store accessed decryption keys to local memory (e.g., memory within one or more user devices included in or implementing access subsystem 104). The keys may be stored to local memory in any suitable way and/or format.

Decryption facility 304 may be configured to use one or more locally stored decryption keys to decrypt encrypted media content accessed by access facility 302. Decryption facility 304 may employ any suitable media content decryption technologies to decrypt the encrypted media content using one or more decryption keys.

As described herein, decryption facility 304 may be configured to access decryption keys from provider subsystem 102 as sets of decryption keys. Exemplary sets of decryption keys and uses of sets of decryption keys to decrypt encrypted media content are described in detail herein.

Presentation facility 306 may be configured to present decrypted media content for experiencing by user 108. The media content may be presented in any suitable form and/or way. For example, presentation facility 306 may provide a media content presentation that may include playing back video and/or audio content for experiencing by user 108.

Storage facility 308 may be configured to maintain data generated and/or otherwise used by facilities 302-306. For example, storage facility 308 may be configured to maintain media content data 310 representative of media content accessed by access facility 302, decrypted by decryption facility 304, and/or presented by presentation facility 306. Storage facility 308 may also maintain key data 312 representative of one or more keys accessed by decryption facility 304. Key data 312 may also include any information that may be used by decryption facility 304 to identify an appropriate key in a set of keys to use to decrypt particular media content. Storage facility 308 may maintain additional or alternative data, including any of the data disclosed herein.

One or more of the operations of system 100 described herein may be performed on and/or in relation to media content in the form of a plurality of temporally aligned media content programs. As used herein, the term "media content program" refers to an instance of media content that may be presented (e.g., played back) by a user device over time for experiencing by a user. For example, a media content program may include a television program, a movie, an audio program, a song, an audio book, a radio broadcast program, a video program, and/or an audio/video program. Typically, such a media content program has a finite duration (e.g., a presentation of the media content program lasts a finite length of time).

Figure 4:
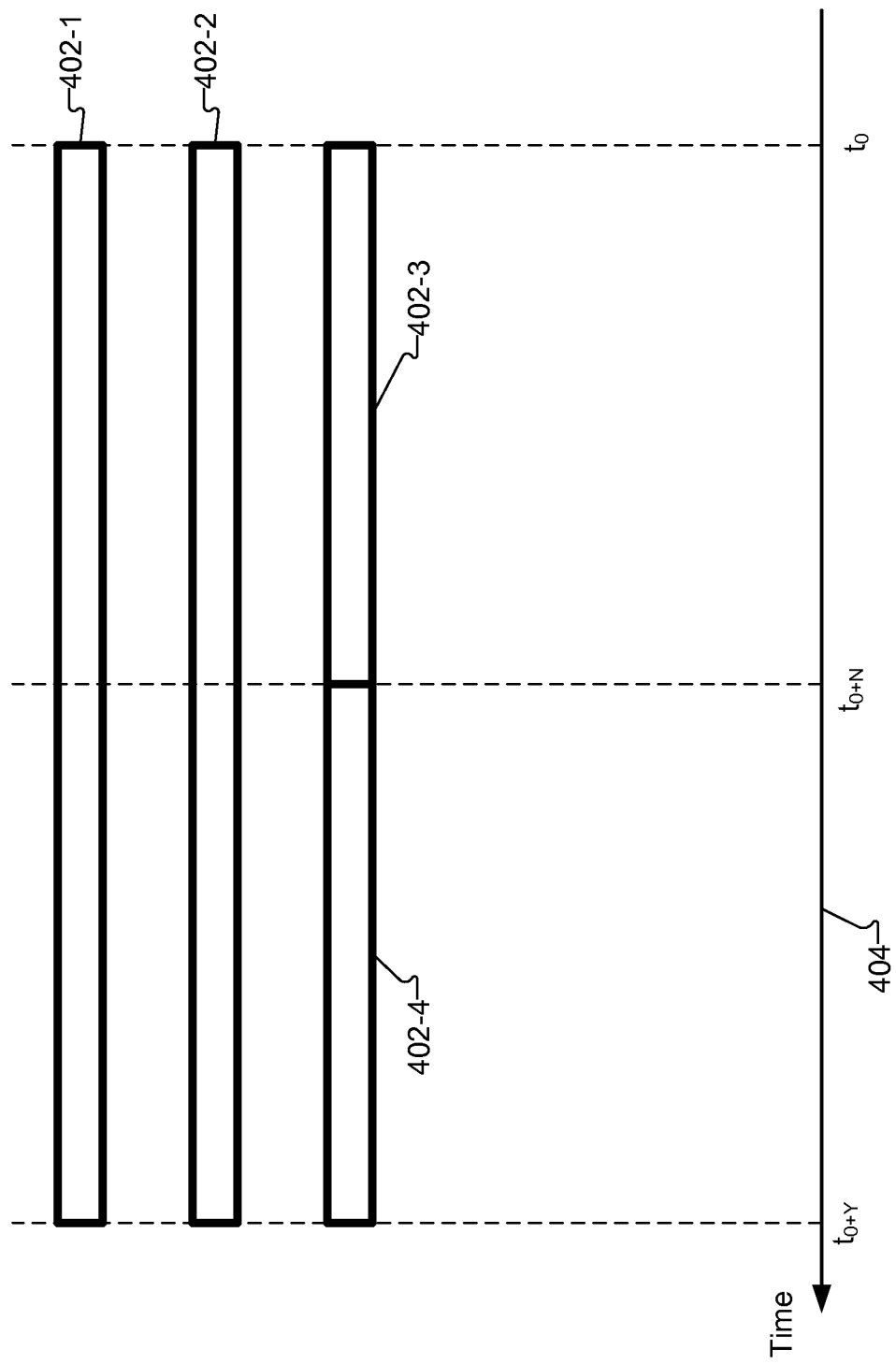
FIG. 4 illustrates an example of temporally aligned media content programs according to principles described herein.

In certain embodiments, media content programs may be temporally aligned in that an operation of system 100, including any of the exemplary operations of system 100 described herein, is performed substantially concurrently by system 100 on and/or in relation to the temporally aligned media content programs. To illustrate, FIG. 4 shows an example of a temporal alignment between media content programs. FIG. 4 illustrates streams of media content programs 402-1 through 402-4 relative to a time axis 404. The streams of media content programs 402-1 through 402-4 may be processed by system 100 over time.

For example, at time $t_0$, a first portion of each of the streams of media content programs 402-1, 402-2, and 402-3 may be processed by system 100, such as by provider subsystem 102 concurrently receiving, capturing, segmenting, encrypting, and/or distributing the first portion of each of the streams of media content programs 402-1, 402-2, and 402-3 at time $t_0$, or by access subsystem 104 concurrently accessing, decrypting, and/or presenting the first portion of each of the streams of media content programs 402-1, 402-2, and 402-3 at time $t_0$. System 100 may continue to process the streams of media content programs 402-1, 402-2, and 402-3 over time until time $t_{0+N}$. During the time interval between time $t_0$ and time $t_{0+N}$, the streams of media content programs 402-1, 402-2, and 402-3 are processed in temporal alignment with one another. Hence, media content programs 402-1, 402-2, and 402-3 are said to be temporally aligned during and/or at any time within the time interval between time $t_0$ and time $t_{0+N}$.

At time $t_{0+N}$, system 100 processing of the stream of media content program 402-3 ends and system 100 processing of the stream of media content program 402-4 begins. System 100 may continue to process the streams of media content programs 402-1, 402-2, and 402-4 over time from time $t_{0+N}$ until time $t_{0+Y}$. During the time interval between time $t_{0+N}$ and time $t_{0+Y}$, the streams of media content programs 402-1, 402-2, and 402-4 are processed in temporal alignment with one another. Hence, media content programs 402-1, 402-2, and 402-4 are said to be temporally aligned during and/or at any time within the time interval between time $t_{0+N}$ and time $t_{0+Y}$.

Media content programs may be temporally aligned for one or more specific implementations of system 100. In certain embodiments, for example, provider subsystem 102 may be configured to distribute media content programs (e.g., transmit or make the media content programs available for user access) in accordance with a predefined distribution schedule. Media content programs scheduled for distribution during concurrent or overlapping programming time slots of the distribution schedule may be processed in temporal alignment by system 100. To illustrate, provider subsystem 102 may be configured to provide a live television programming distribution service (e.g., a live television broadcast service or a live television Internet streaming service) that allows users to access live television programming during specific time slots in which the live television programming is distributed by provider subsystem 102 in accordance with a predefined distribution schedule (e.g., a predefined television broadcast or multicast schedule).

Figure 5:
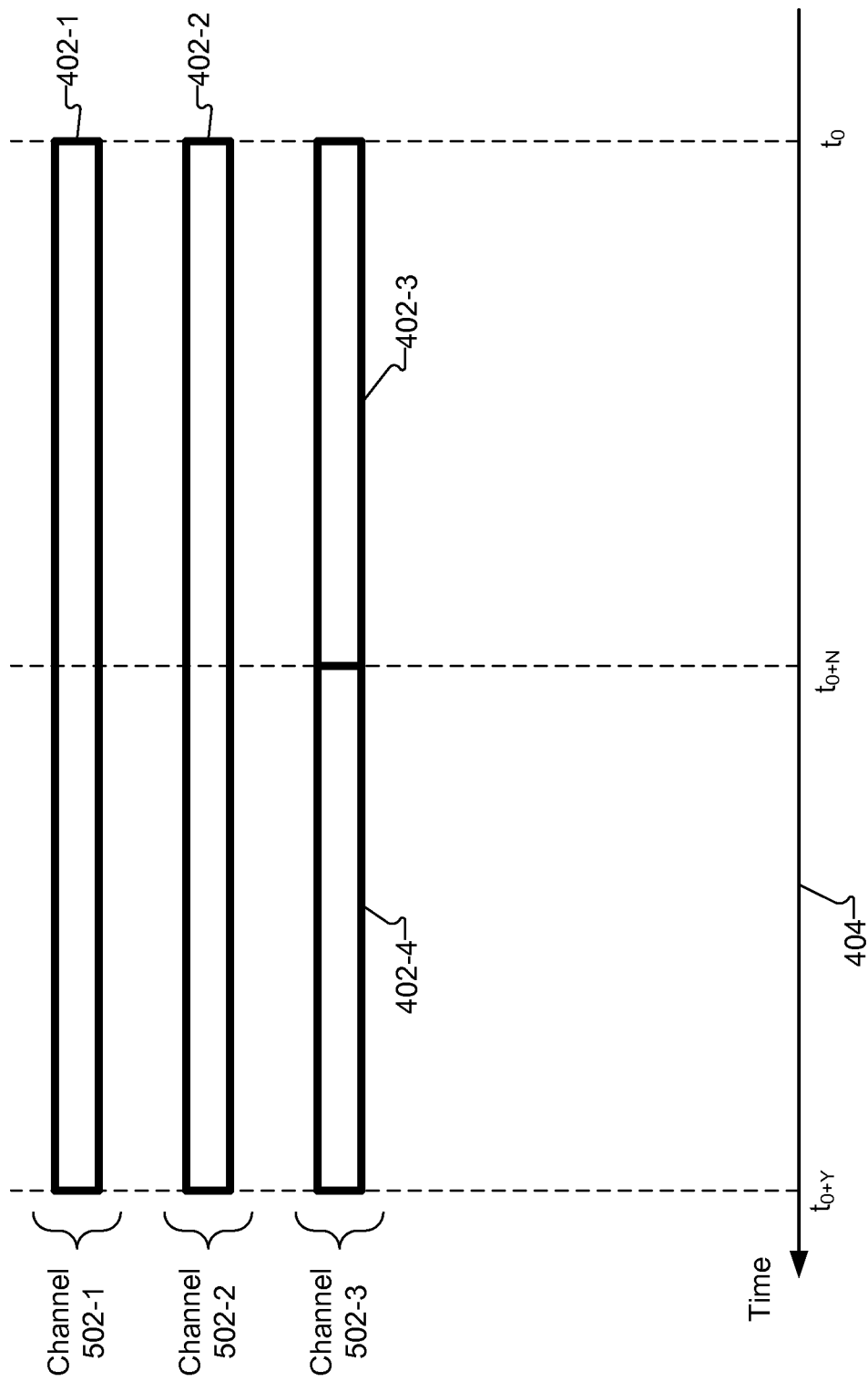
FIG. 5 illustrates an exemplary association of media content programs to media content channels according to principles described herein.

In certain implementations, streams of media content programs may be associated with (e.g., carried by, mapped to, etc.) media content channels. For example, data representative of media content programs may be carried by signals within defined frequency bands referred to as media content carrier channels. Additionally or alternatively, media content programs may be mapped to virtual media content programming channels (e.g., television channels), which are in turn mapped to media content carrier channels carrying data representative of the media content programs. For example, FIG. 5 illustrates streams of media content programs 402-1 through 402-4 as being associated with respective channels 502-1 through 502-3, which may comprise television channels in certain implementations. As shown in this particular example, the stream of media content program 402-1 may be associated with media content channel 502-1, the stream of media content program 402-21 may be associated with media content channel 502-2, and the streams of media content program 402-3 and 402-4 may be associated with media content channel 502-3.

System 100 may use media content channels to access and/or distribute streams of media content programs. For example, provider subsystem 102 may be configured to access media content channels transmitted by a source of media content streams in order to access and capture media content programs associated with the media content channels. As another example, in certain embodiments, provider subsystem 102 may be configured to distribute media content programs by transmitting data representative of the media content programs over respective media content channels, and access subsystem 104 may be configured to access select media content programs by selecting to access (e.g., tune to, request transmission of, etc.) the media content channels associated with the select media content programs. To illustrate, in some examples, access subsystem 104 may access channel 502-3 at any time between time $t_0$ and time $t_{0+N}$ to access media content program 402-3 and/or at any time between time $t_{0+N}$ and $t_{0+Y}$ to access media content program 402-4.

Figure 6:
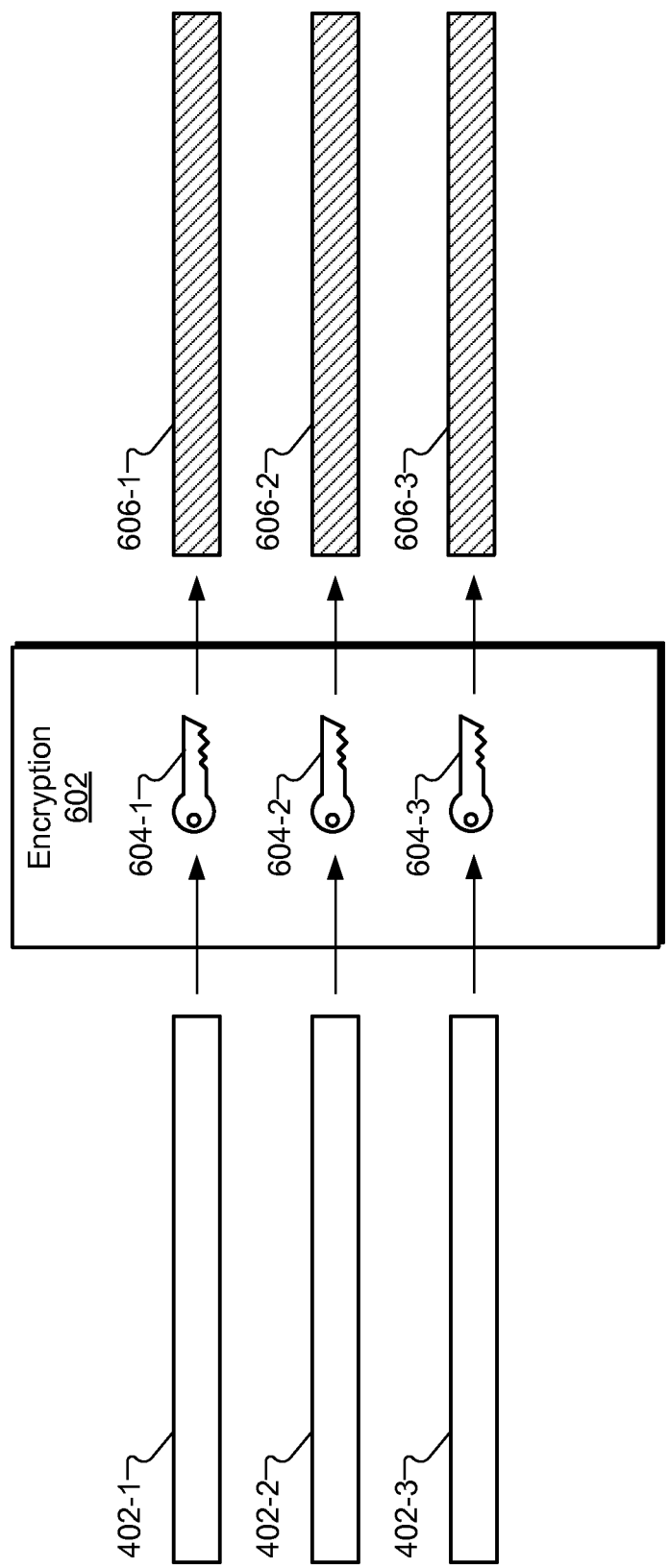
FIG. 6 illustrates exemplary encryption of temporally aligned media content programs according to principles described herein.

As mentioned, system 100 may concurrently perform an operation of system 100 on and/or in relation to media content programs that are temporally aligned. FIG. 6 illustrates an exemplary encryption of temporally aligned media content programs. The encryption of temporally aligned media content programs represented in FIG. 6 may be performed with substantial concurrence by provider subsystem 102 over time.

As shown in FIG. 6, streams of temporally aligned media content programs 402 (e.g., media content programs 402-1, 402-2, and 402-3) may be subjected to an encryption 602. Within the encryption 602, a set of distinct encryption keys 604 (e.g., encryption keys 604-1 through 604-3) may be used to encrypt the temporally aligned media content programs 402 to generate encrypted media content programs 606 (e.g., encrypted media content programs 606-1 through 606-3). In particular, encryption key 604-1 may be applied to encrypt media content program 402-1 to produce encrypted media content program 606-1, encryption key 604-2 may be applied to encrypt media content program 402-2 to produce encrypted media content program 606-2, and encryption key 604-3 may be applied to encrypt media content program 402-3 to produce encrypted media content program 606-3.

By applying a distinct encryption key 604 to each of the temporally aligned media content programs 402, provider subsystem 102 may be able to control access to encrypted media content programs and/or media content channels associated with the media content programs on an individual basis. Accordingly, a variety of different packages of media content programs and/or media content channels may be provided for conditional access by select users.

The encryption 602 illustrated in FIG. 6 may be performed by provider subsystem 102 over time. Thus, the encryption 602 of the media content programs may be a progressive encryption of the media content programs over time.

Prior to using the set of distinct encryption keys 604 to encrypt the temporally aligned media content programs 402, provider subsystem 102 may generate and/or reserve the set of distinct encryption keys 604 for use to encrypt the temporally aligned media content programs 402. Provider subsystem 102 may maintain key data 212 representative of the encryption keys 604. Key data 212 may also include data representing relationships between the encryption keys 604 and media content programs and/or channels. Such information may be distributed together with data representative of a set of encryption keys 604 for use by access subsystem 104 to identify an appropriate decryption key included in the set for use to decrypt a particular media content program (e.g., a stream carrying a media content program on a particular channel).

In certain embodiments, system 100 may be configured to segment and encrypt segments of temporally aligned media content programs. Each encryption segment may be temporally aligned and may use a different set of encryption keys. Accordingly, in order to be able to decrypt a segment-encrypted media content program, access subsystem 104 retrieves a new set of decryption keys for each temporally aligned segment of the media content program. Such segmented encryption may enhance the security of the encrypted media content programs.

Figure 7:
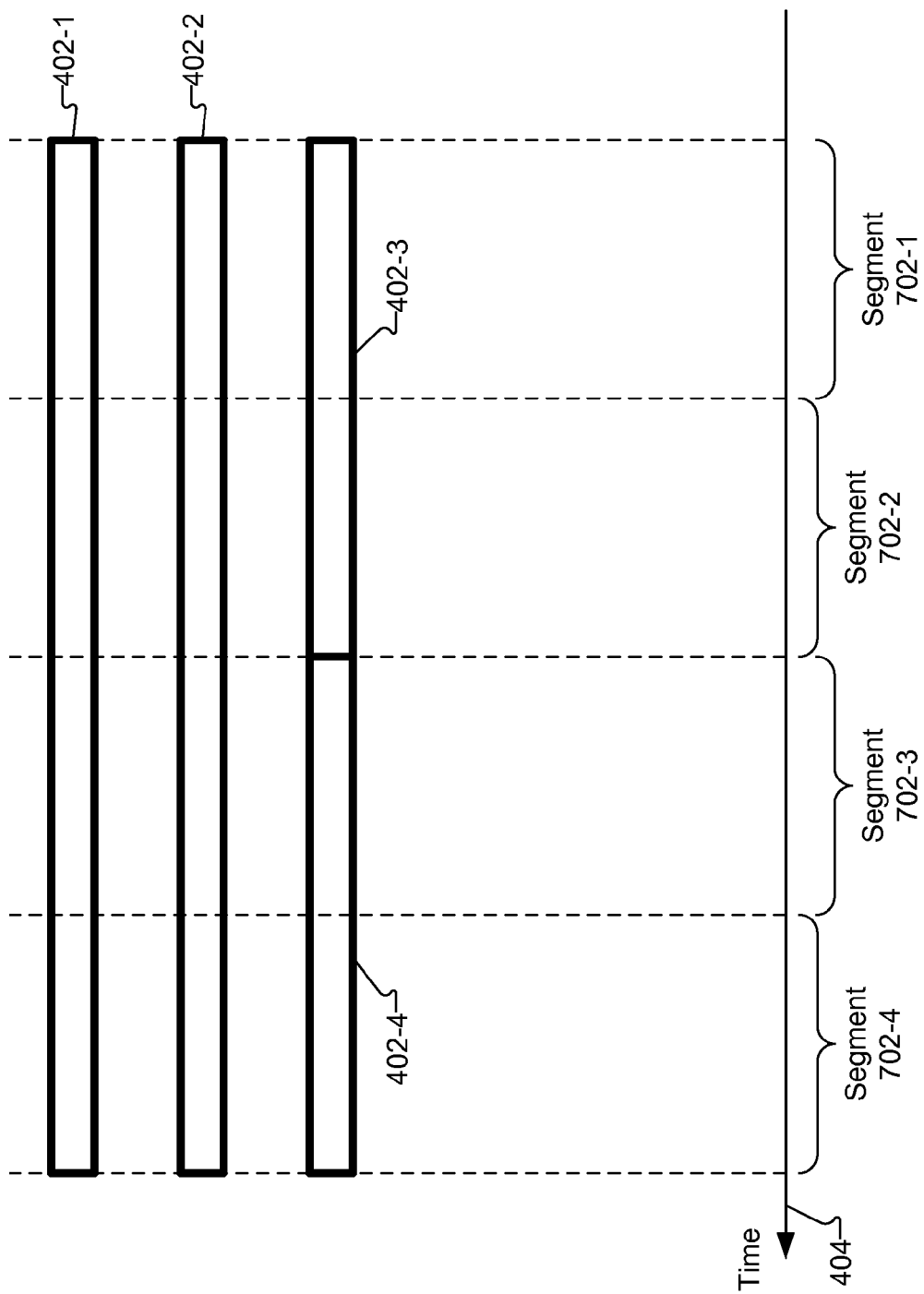
FIG. 7 illustrates exemplary temporally aligned segmentation of temporally aligned media content programs according to principles described herein.

To illustrate, FIG. 7 shows an example of temporally aligned segmentation of temporally aligned media content programs. As shown, temporally aligned media content programs have been segmented into segments 702 (e.g., segments 702-1 through 702-4). In particular, temporally aligned media content programs 402-1, 402-2, and 402-3 have been segmented into segments 702-1 and 702-2, and temporally aligned media content programs 402-1, 402-2, and 402-4 have been segmented into segments 702-3 and 702-4.

As illustrated in FIG. 7, each segment 702 may be temporally aligned across temporally aligned media content programs. For example, segment 702-1 spans the same time interval for each of temporally aligned media content programs 402-1, 402-2, and 402-3.

The interval of a segment 702 may be defined as may suit a particular implementation. In certain examples, the length of a segment interval may be defined by an operator of provider subsystem 102 in accordance with an agreement between a content provider and the operator of provider subsystem 102. For instance, the interval length may be defined to be approximately ten seconds in some implementations and ten minutes in other implementations. This is illustrative only. Any suitable interval length may be used.

Figure 8:
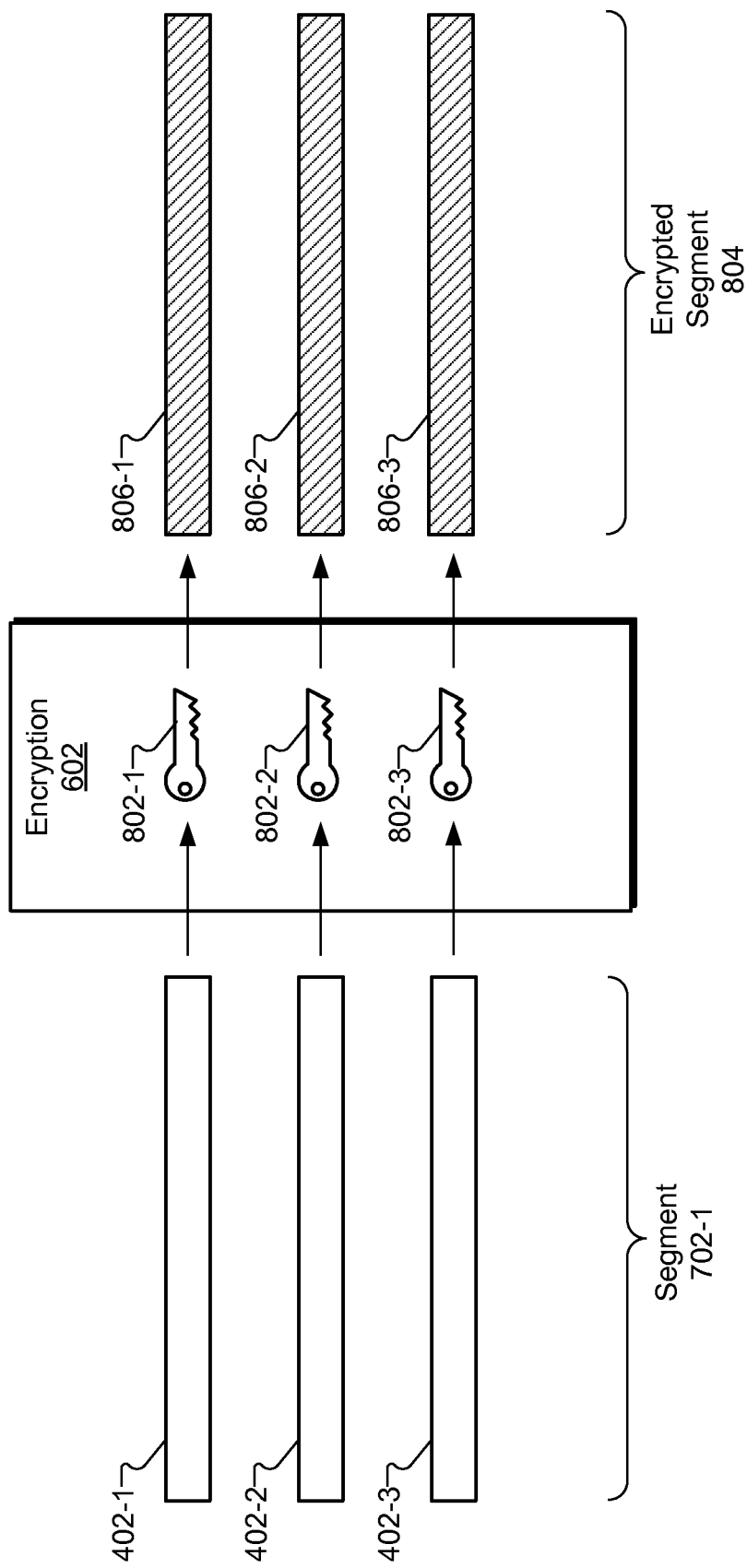
FIGS. 8-9 illustrate exemplary encryption of temporally aligned segments of temporally aligned media content programs according to principles described herein.
Figure 9:
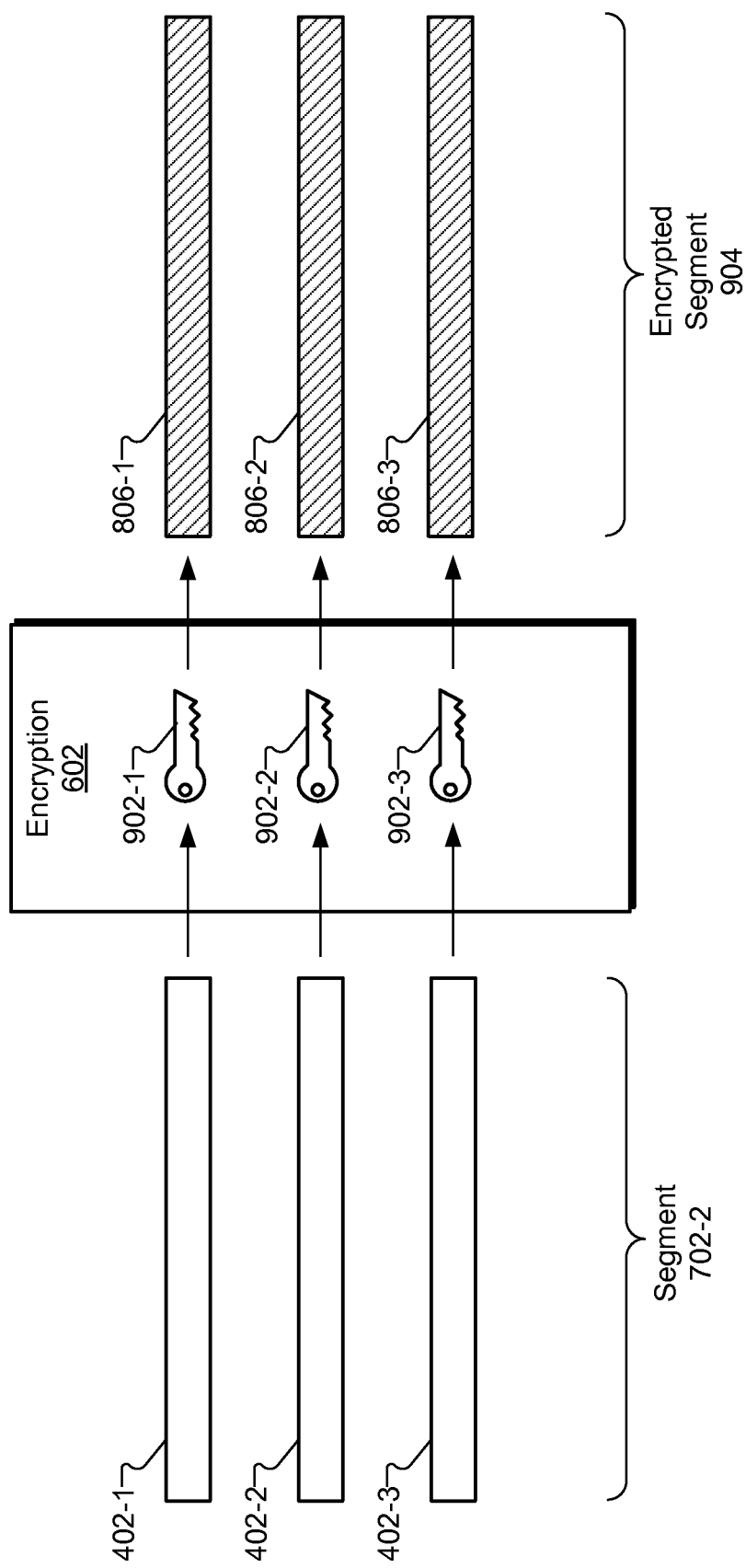

Provider subsystem 102 may be configured to use a distinct set of encryption keys to encrypt each segment 702 of temporally aligned media content programs. For example, FIG. 8 illustrates that provider subsystem 102 may use a particular set of encryption keys 802 (e.g., encryption keys 802-1 through 802-3) in encryption 602 to encrypt segment 702-1 of temporally aligned media content programs 402-1, 402-2, and 402-3 to generate an encrypted segment 804 of temporally aligned encrypted media content programs 806-1, 806-2, and 806-3. FIG. 9 illustrates that provider subsystem 102 may use another, different set of encryption keys 902 (e.g., encryption keys 902-1 through 902-3) in encryption 602 to encrypt another segment 702-2 of temporally aligned media content programs 402-1, 402-2, and 402-3 to generate an encrypted segment 904 of temporally aligned encrypted media content programs 806-1, 806-2, and 806-3.

After provider subsystem 102 has encrypted temporally aligned media content programs, such as in any of the ways described herein, provider subsystem 102 may distribute one or more of the encrypted media content programs for access by access subsystem 104. The distribution may be performed in any suitable way, including in any of the ways described herein.

Provider subsystem 102 may provide sets of decryption keys to access subsystem 104 for use by access subsystem 104 to decrypt encrypted media content distributed by provider subsystem 102. Provider subsystem 102 may provide a set of decryption keys to access subsystem 104 in any suitable way, such as by transmitting data representative of the set of decryption keys to access subsystem 104 over network 106. In certain embodiments, access subsystem 104 may request and download a set of decryption keys from provider subsystem 102 in a single download session. By retrieving a set of decryption keys from provider subsystem 102 in a single download session, a number of calls to provider subsystem 102 and/or a number of connections for download sessions established with provider subsystem 102 may be minimized as compared to conventional "on-the-fly" and/or "an needed" retrieval of an individual decryption key from a remote source.

Provider subsystem 102 may provide a set of decryption keys in any suitable format and together with any other information that may be useful to access subsystem 104, such as information indicating relationships that the decryption keys in the set have with media content programs, encryption segments of media content programs, channels, and/or programming time slots. For example, a set of decryption keys and associated information may be provided as a single data file and/or data table.

In some examples, a set of decryption keys distributed by access subsystem 104 may include only decryption keys associated with temporally aligned media content programs. That is, the set of decryption keys may be specific to the temporally aligned media content programs.

In some examples, a set of decryption keys distributed by access subsystem 104 may include only decryption keys associated with a temporally aligned encryption segment of temporally aligned media content programs. That is, the set of decryption keys may be specific to the temporally aligned encryption segment.

In some examples, a set of decryption keys distributed by access subsystem 104 may include only decryption keys associated with media content programs and/or channels that a user is entitled to access. To illustrate, provider subsystem 102 may determine, from a plurality of media content programs, a set of temporally aligned media content programs to which the user is entitled access. The determination may be based on digital rights management ("DRM") licenses, user subscription data, and/or other entitlement data. Provider subsystem 102 may then determine a set of decryption keys associated with the set of temporally aligned media content programs to which the user is entitled access. This determination may be based on information included in key data 212 maintained by provider subsystem 102.

In certain implementations in which media content programs are associated with channels, provider subsystem 102 may determine, from a plurality of media content channels associated with the media content programs, a set of channels to which the user is entitled access. In some examples, this determination may be based on user subscription data specifying a subscription or channel package that the user is entitled to access. Provider subsystem 102 may then determine a set of decryption keys associated with the set of channels.

Access subsystem 104 may be configured to access, and provider subsystem 102 may be configured to provide, a set of decryption keys in advance of when access subsystem 104 accesses the corresponding encrypted media content program data to which the set of decryption keys may be applied to decrypt the encrypted media content program data. Access subsystem 104 may store the accessed set of decryption keys in local memory within access subsystem 104 such that the set of decryption keys are ready for local access by access subsystem 104 as needed (as opposed to "as needed" remote retrieval of an individual decryption key) to decrypt encrypted media content distributed by provider subsystem 102.

Figure 10:
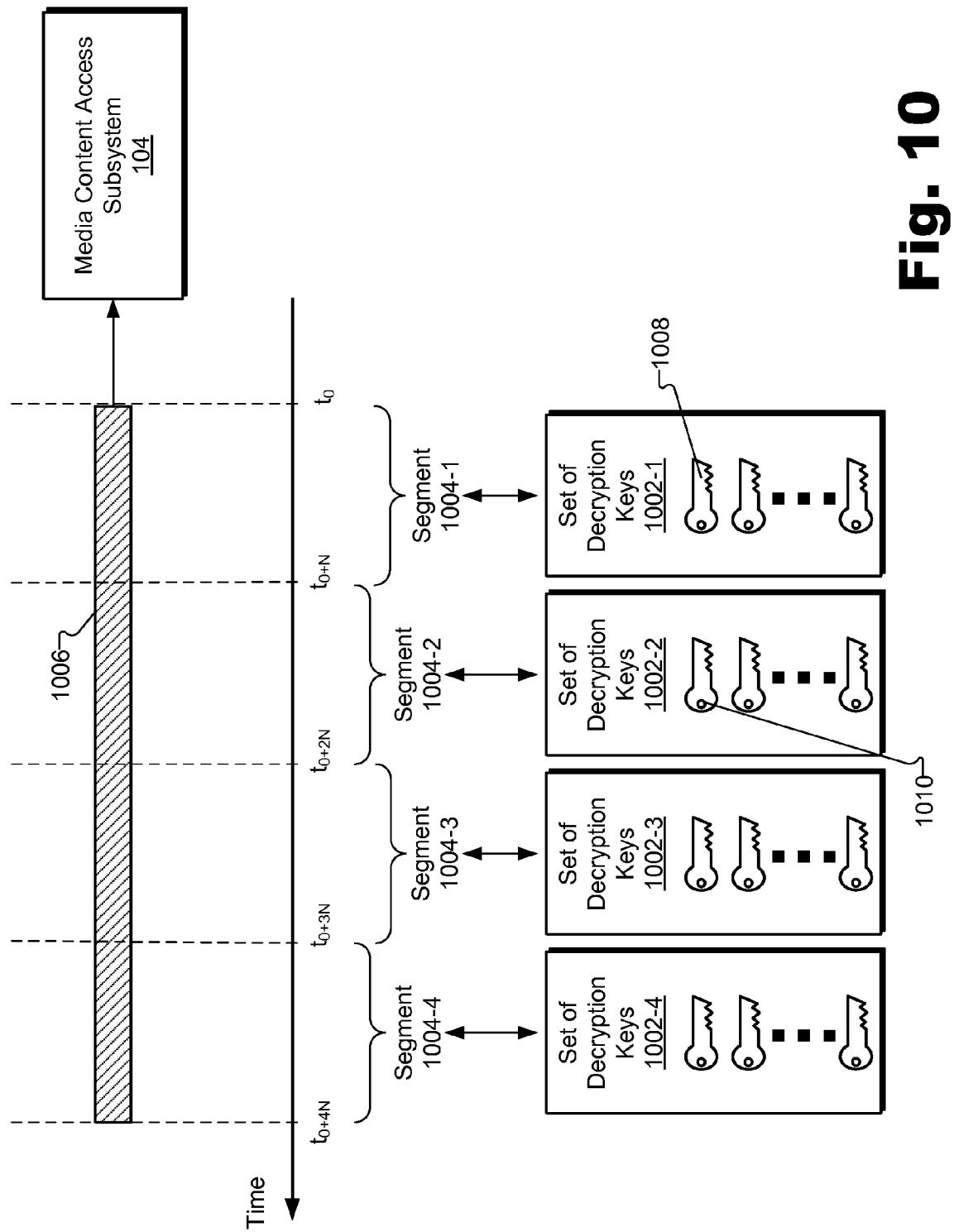
FIG. 10 illustrates an example of a media content access subsystem accessing a segment-encrypted media content program and associated sets of decryption keys over time according to principles described herein.

To illustrate, FIG. 10 shows an example of timing associated with access subsystem 102 accessing sets 1002 (e.g., sets 1002-1 through 1002-4) of decryption keys corresponding to different encryption segments 1004 (e.g., encryption segments 1004-1 through 1004-4) of an encrypted media content program 1006 distributed (e.g., streamed) by provider subsystem 102 and accessed by access subsystem 104 over time. As shown, decryption key set 1002-1 may correspond to segment 1004-1, meaning that the decryption keys in set 1002-1 may be used to decrypt encrypted media content program segments temporally aligned with encryption segment 1004-1. For instance, decryption key 1008 included in set 1002-1 may be configured for use by access subsystem 104 to decrypt encrypted segment 1004-1 of media content program 1006. Similarly, decryption key set 1002-2 may correspond to segment 1004-2, meaning that the decryption keys in set 1002-2 may be used to decrypt encrypted media content program segments temporally aligned with encryption segment 1004-2, and so on for each of the decryption key sets 1002 and corresponding encryption segments 1004 shown in FIG. 10.

Access subsystem 104 may be configured to begin processing segment 1004-1 of media content program 1006 at time $t_0$. Access subsystem 104 may be configured to access, and provider subsystem 102 may be configured to provide, data representative of decryption key set 1002-1 in advance of time $t_0$ such that access subsystem 104 may store decryption key set 1002-1 in local memory before time $t_0$ and be prepared to use any of the keys included in decryption key set 1002-1 stored in local memory to decrypt a segment of an encrypted media content program that is accessed by access subsystem 104 and aligned with encryption segment 1004-1, beginning at time $t_0$. Similarly, access subsystem 104 may be configured to access, and provider subsystem 102 may be configured to provide, data representative of decryption key set 1002-2 in advance of time $t_{0+N}$ such that access subsystem 104 may store decryption key set 1002-2 in local memory before time $t_{0+N}$ and be prepared to use any of the keys included in decryption key set 1002-2 stored in local memory to decrypt a segment of an encrypted media content program that is accessed by access subsystem 104 and aligned with encryption segment 1004-2, beginning at time $t_{0+N}$. For instance, at time $t_{0+N}$, access subsystem 104 may access and use decryption key 1010 included in decryption key set 1002-2 to decrypt segment 1004-2 of media content program 1006.

The accessing and storing of sets of decryption keys in advance of processing encrypted media content accessed from provider subsystem 102 may be accomplished in any suitable way. For example, access subsystem 104 may be configured to detect an upcoming transition from one encryption segment 1004 to another encryption segment 1004 and, in response to the detection, request, receive, and store data representative of a decryption key set 1002 corresponding to the upcoming segment 1004 in advance of the transition to the segment 1004.

After a set of decryption keys is no longer needed, access subsystem 104 may remove data representative of the set of decryption keys from local memory. For example, after time $t_{0+N}$, decryption key set 1002-1 may no longer be needed and may be deleted from local memory.

Access subsystem 104 may be configured to switch from accessing one encrypted media content program distributed by provider subsystem 102 to access another, temporally aligned, encrypted media content program distributed by provider subsystem 102. Such a switch may be performed by access subsystem 104 in response to any predefined event, such as detection of user input (e.g., channel change input) provided by a user of access subsystem 104 to initiate the switch. When access subsystem 104 switches from accessing one encrypted media content program to accessing another, temporally aligned, encrypted media content program, access subsystem 104 may access and use distinct decryption keys included in the same locally stored set of decryption keys to decrypt the first encrypted media content program before the switch and the other encrypted media content program after the switch, without having to retrieve a decryption key from a remote source in conjunction with the switch.

Figure 11:
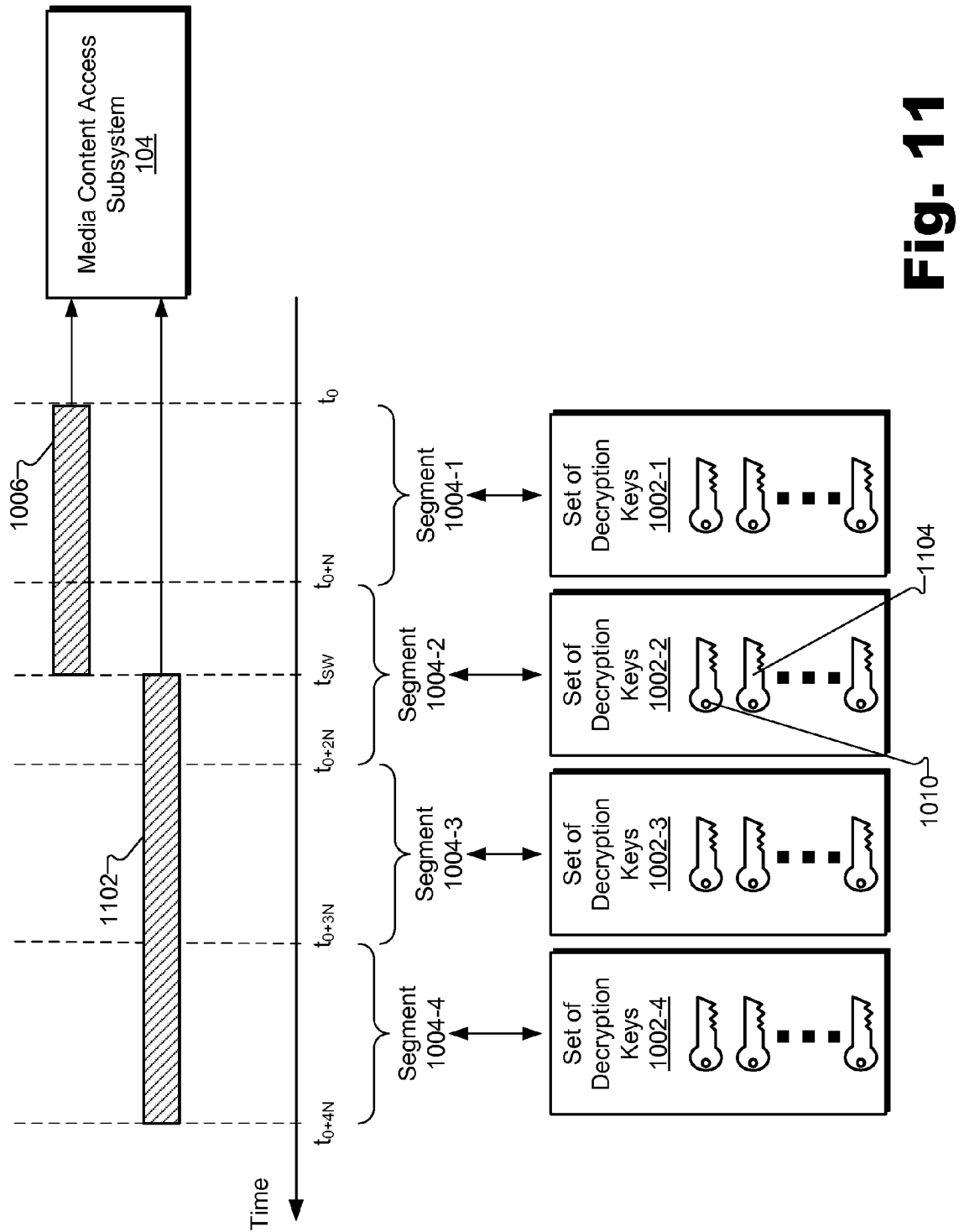
FIG. 11 illustrates an example of a media content access subsystem switching from accessing one encrypted media content program to accessing another encrypted media content program and using keys includes in a set of decryption keys to decrypt the encrypted media content programs according to principles described herein.

FIG. 11 illustrates an example of access subsystem 104 switching from accessing encrypted media content program 1006 to accessing another encrypted media content program 1102 at time $t_{SW}$. The switch may be performed by access subsystem 104 in response to a predefined event. For example, access subsystem 104 may receive user input provided by a user and indicating a request by the user to access media content program 1102. In response to the user input request, access subsystem 104 may switch to accessing media content program 1102

The switch may be performed in any suitable way. For example, access subsystem 104 may send a request for access media content program 1102 to provider subsystem 102, which may respond by distributing (e.g., streaming) the media content program 1102 to access subsystem 104. As another example, access subsystem 104 may select a stream carrying the media content program 1102 for processing, such as by tuning from one media content channel to another media content channel to access the stream.

As shown in FIG. 11, the switch may occur at time $t_{SW}$, which time falls within a time interval spanned by encryption segment 1004-2. From time $t_{0+N}$ to time $t_{SW}$, access subsystem 104 may use decryption key 1010 included in decryption key set 1002-2 stored in local memory to decrypt media content program 1006 being accessed by access subsystem 104. Access subsystem 104 may then detect a request to switch from accessing media content program 1006 to access media content program 1102. At time $t_{SW}$, access subsystem 104 may effectuate the switch. As part of effectuating the switch, access subsystem 104 may access another key 1104 included in the same decryption key set 1002-2 stored in local memory for use to decrypt encrypted media content program 1102 from time $t_{SW}$ to time $t_{0+2N}$ within encryption segment 1004-2. By being able to access decryption key 1104 from local memory instead of from a remote source at time $t_{SW}$, the time to effectuate the switch may be shorter in duration than it would be if remote access of decryption key 1104 were needed in conjunction with the switch at time $t_{SW}$. Thus, a delay associated with switching from accessing one media content program to accessing another media content program for presentation may be shortened, which may promote a quality user experience.

Figure 12:
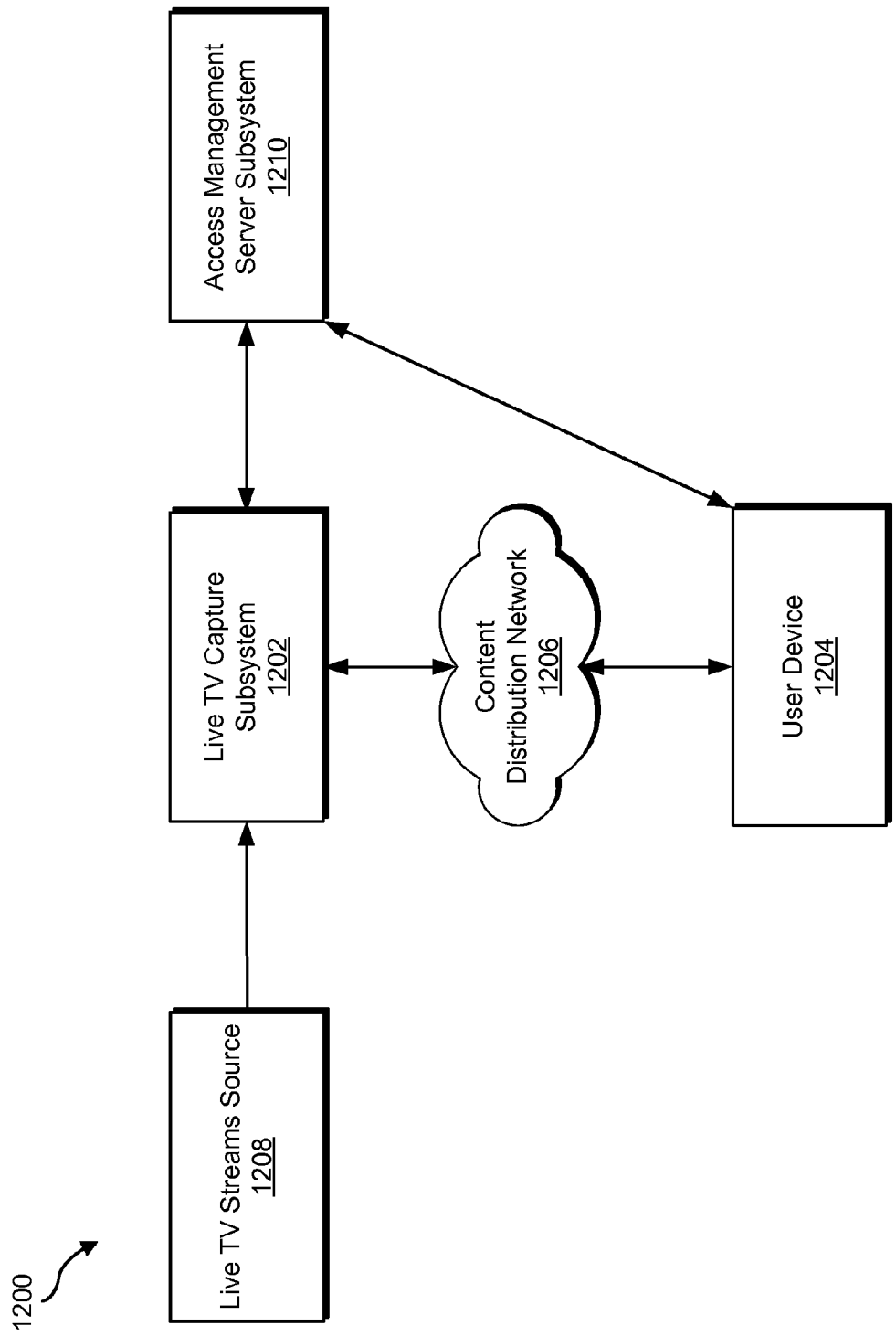
FIG. 12 illustrates an exemplary media content distribution system according to principles described herein.

FIG. 12 illustrates another exemplary media content distribution system 1200 ("system 1200"). In certain embodiments, system 1200 may be an implementation of system 100, and one or more components of system 100 may be implemented in one or more components of system 1200.

As shown, system 1200 may include a live television ("TV") capture subsystem 1202 ("capture subsystem 1202") and a user device 1204 configured to communicate with one another by way of a content distribution network 1206 ("network 1206"). Capture subsystem 1202 may include or be implemented by one or more computing devices of a server-side computing system controlled by (e.g., operated by) a service provider such as a live television content distribution service provider. User device 1204 may include a client-side computing device controlled by (e.g., operated by) a user (e.g., an end user of one or more services provided by capture subsystem 1202). Examples of such devices include, without limitation, a personal computer, a mobile phone device, a smart phone, a tablet computer, a set-top box device, a DVR device, a gaming device, and any other computing device configured to access a service and/or media content provided by capture subsystem 1202.

Capture subsystem 1202 and user device 1204 may communicate using any remote communications technologies suitable to support distribution of and access to television content distributed by capture subsystem 1202 over network 1206, including any of the exemplary technologies disclosed herein. Network 1206 may include any network or combination of networks suitable for transporting television content, including any of the exemplary networks disclosed herein. In certain examples, network 1206 comprises or employs the Internet to transport (e.g., stream) television content distributed by capture subsystem 1202 for access by user device 1204.

Capture subsystem 1202 may be configured to receive and capture live television content streams carrying live television content programs from a live television streams source 1208 ("source 1208"). Source 1208 may include any suitable source of live television content. For example, source 1208 may include one or more components of a subscriber television network, such as a super head-end facility, a head-end facility, a video hub office ("VHO") facility, a video service facility ("VSO"), a television content broadcast facility, a satellite broadcast facility. In certain embodiments, source 1208 may include the same source from which a subscriber television content provider obtains television content that the subscriber television content provider distributes to subscribers to a live television content distribution service (e.g., a cable or satellite subscriber television service).

In certain embodiments, the streams of television content programs provided by source 1208 may be associated with television channels. Capture subsystem 1202 may be configured to maintain data representative of relationships between television channels and streams of television content programs. Capture of streams of television content programs received from source 1208 may include capture subsystem 1202 capturing temporally aligned streams of television content programs, such as described herein.

After receiving and capturing streams of live television content provided by source 1208, capture subsystem 1202 may perform additional preprocessing on the captured streams. For example, capture subsystem 1202 may segment temporally aligned streams into temporally aligned segments and encrypt the temporally aligned segments of the streams, such as described herein. Capture subsystem 1202 may then distribute the encrypted streams of live television content over content distribution network 1206 for access by user device 104 in any of the way described herein. In certain embodiments, capture subsystem 1202 may be configured to stream live television content to the user device in real time.

Capture subsystem 1202 may be further configured to communicate with an access management server subsystem 1210 ("access subsystem 1210"). Capture subsystem 1202 and access subsystem 1210 may communicate using any communications technologies suitable for exchanging data (e.g., key data 212).

Access subsystem 1210 and capture subsystem 1202 may manage one or more keys configured to be used to encrypt and/or decrypt television content. For example, capture subsystem 1202, access subsystem 1210, or a combination thereof may generate and reserve encryption keys for use by capture subsystem 1202 to encrypt live television content. Additionally, capture subsystem 1202, access subsystem 1210, or a combination thereof may maintain data representative of decryption keys configured for use by user device 1204 to decrypt encrypted television content distributed by capture subsystem 1202.

Access subsystem 1210 and capture subsystem 1202 may also manage data representative of user entitlements to television content programs and/or channels (e.g., subscriber subscription information specifying television content programs and/or channels that a subscriber is entitled to access), DRM information (e.g., DRM licenses), and/or any other information that specifies television content programs and/or channels that a user is entitled to access.

In certain embodiments, capture subsystem 1202 may send data representative of a set of decryption keys configured to be used to decrypt a plurality of temporally aligned television content programs to access subsystem 1210, which may store the set of decryption keys. The set of decryption keys may include distinct decryption keys used by or reserved for use by capture subsystem 1202 to encrypt the temporally aligned television content programs.

Access subsystem 1210 may be configured to communicate with user device 1204. Access subsystem 1210 and user device 1204 may communication with one another using any suitable remote communication technologies. In certain examples, access subsystem 1210 and user device 1204 may communicate by way of network 1206. In other examples, access subsystem 1210 and user device 1204 may communicate by way of another path.

User device 1204 may be configured to send requests for sets of decryption keys to access subsystem 1210. For example, user device 1204 may detect an upcoming need for a set of decryption keys configured to decrypt certain temporally aligned television content programs. User device 1204 may send a request for the set of decryption keys to access subsystem 1210, which may receive the request and respond by identifying and sending an appropriate set of decryption keys to user device 1204.

To illustrate, access subsystem 1210 may use the request and/or data stored by or accessible to access subsystem 1210 to determine a user associated with user device 1204. Access subsystem 1210 may then determine, based on entitlement data (e.g., license or subscription data associated with the user) stored by access subsystem 1210, a set of television content programs or channels that the user is entitled to access. Access subsystem 1210 may then determine a set of decryption keys associated with the set of entitled television content programs or channels and send data representative of the set of decryption keys to user device 1204.

User device 1204 may receive and store the set of decryption keys in local memory of the user device. User device 1204 may then use any of the distinct decryption keys included in the locally stored set of decryption keys to decrypt and present (e.g., play back) a television content program distributed by capture subsystem 1202 and accessed by user device 1204, such as described herein.

As described herein, the set of decryption keys may include distinct decryption keys configured to be used to decrypt a set of temporally aligned television content programs associated with a set of television channels. Thus, when a user of user device 1204 provides user input instructing user device to change channels from one television channel to another television channel, user device 1204 may switch from one television channel to another television channel to access a different television content program. User device 1204 may access and use a decryption key included in the locally stored set of decryption keys to decrypt the television content program, without having to dynamically and/or individually retrieve a new decryption key remotely from access subsystem 1210.

Figure 13:
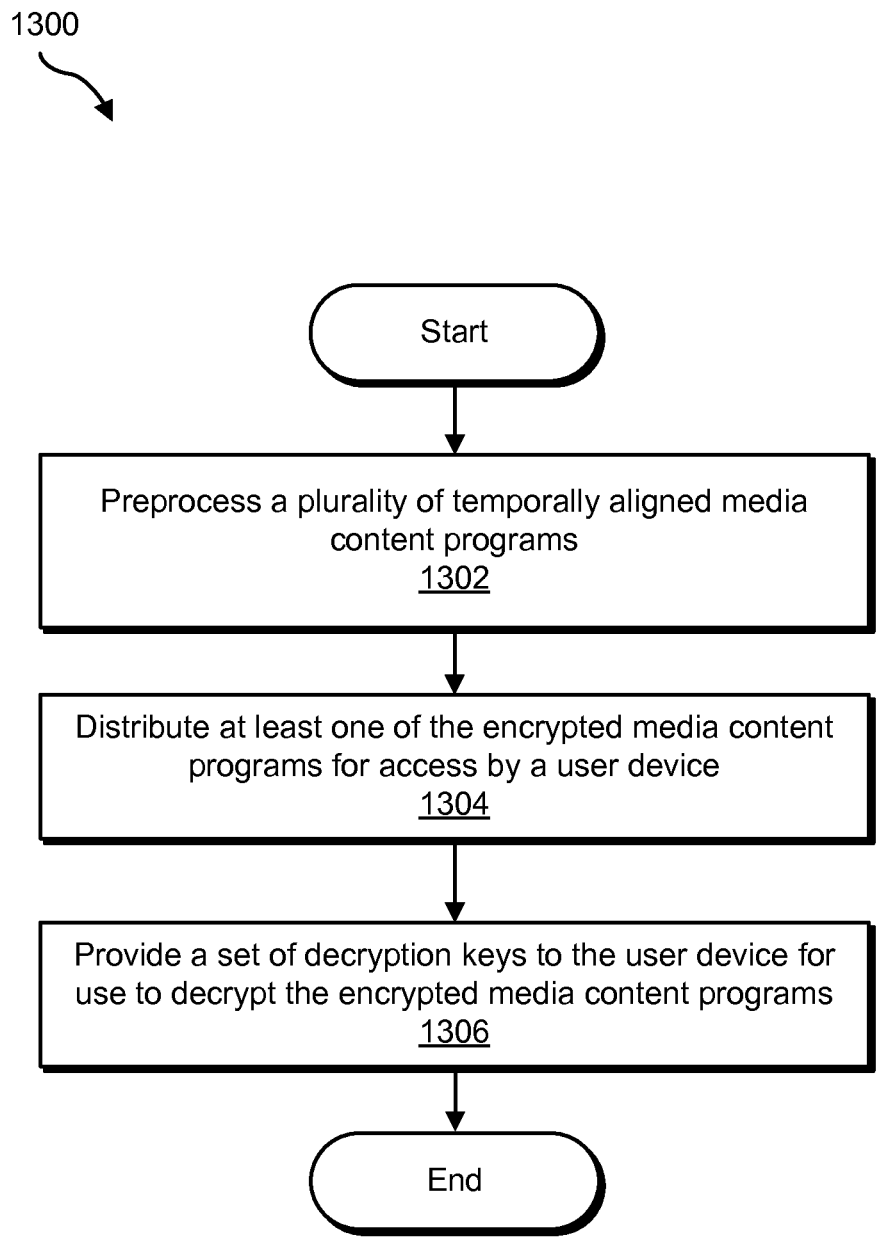
FIGS. 13-15 illustrate exemplary methods of managing decryption keys in relation to distributing and accessing encrypted media content according to principles described herein.

FIG. 13 illustrates an exemplary method 1300 of managing decryption keys in relation to distributing encrypted media content. While FIG. 13 illustrates exemplary steps according to certain embodiments, other embodiments may omit, add to, reorder, combine, and/or modify any of the steps shown in FIG. 13. In certain embodiments, one or more of the steps shown in FIG. 13 may be performed by provider subsystem 102, capture subsystem 1202, and/or access subsystem 1210.

In step 1302, provider subsystem 102 preprocesses a plurality of temporally aligned media content programs. Provider subsystem 102 may preprocess the temporally aligned media content programs in any of the ways described herein, including by receiving, capturing, segmenting, and/or encrypting the media content programs.

In step 1304, provider subsystem 102 distributes at least one of the encrypted media content programs for access by a user device. Provider subsystem 102 may distribute at least one of the temporally aligned, encrypted media content programs in any of the ways described herein. In certain examples, step 1304 may include switching from streaming one encrypted media content program to streaming another, temporally aligned, encrypted media content program, such as in response to a request provided by the user device for the other media content program.

In step 1306, provider subsystem 102 provides a set of decryption keys to the user device for use by the user device to decrypt the temporally aligned, encrypted media content programs. Provider subsystem 102 may provide the set of decryption keys to the user device as a set (e.g., in a single data file or data table and/or in a single download) in any of the ways described herein.

Figure 14:
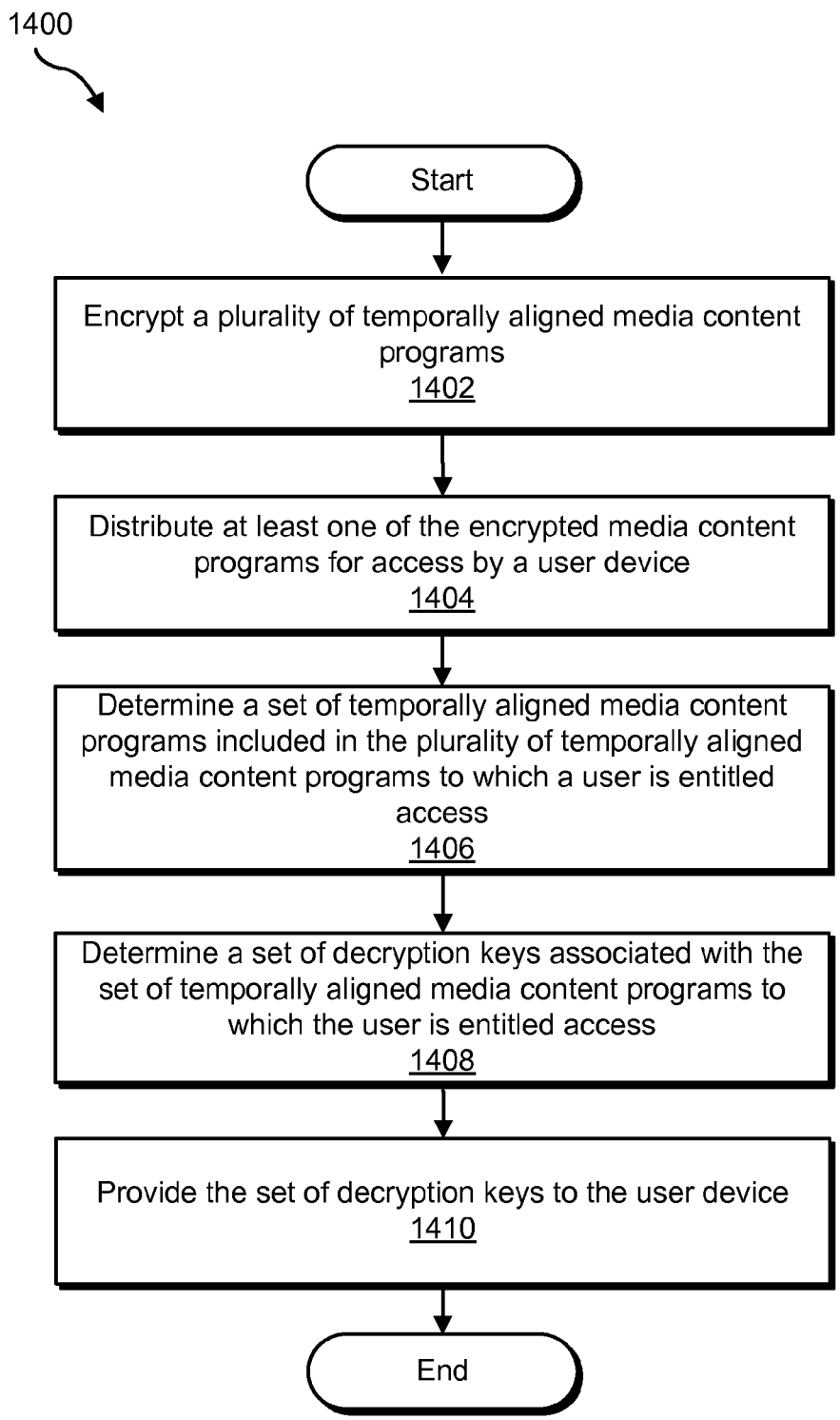

FIG. 14 illustrates another exemplary method 1400 of managing decryption keys in relation to distributing encrypted media content. While FIG. 14 illustrates exemplary steps according to certain embodiments, other embodiments may omit, add to, reorder, combine, and/or modify any of the steps shown in FIG. 14. In certain embodiments, one or more of the steps shown in FIG. 14 may be performed by provider subsystem 102, capture subsystem 1202, and/or access subsystem 1210.

In step 1402, provider subsystem 102 encrypts a plurality of temporally aligned media content programs. Provider subsystem 102 may encrypt the temporally aligned media content programs in any of the ways described herein, including by segment-encrypting the temporally aligned media content programs.

In step 1404, provider subsystem 102 distributes at least one of the encrypted media content programs for access by a user device. Provider subsystem 102 may distribute at least one of the encrypted media content programs in any of the ways described herein. In certain examples, step 1404 may include switching from streaming one encrypted media content program to streaming another, temporally aligned, encrypted media content program, such as in response to a request provided by the user device for the other media content program.

In step 1406, provider subsystem 102 determines a set of temporally aligned media content programs included in the plurality of temporally aligned media content programs to which a user is entitled access. Provider subsystem 102 may determine the set of temporally aligned media content programs to which the user is entitled access in any of the ways described herein. In certain examples, the set is a subset of the plurality of temporally aligned media content programs.

In certain examples, the set of media content programs includes media content programs associated with a set of channels to which the user is entitled access. In such examples, provider subsystem 102 may determine the set of channels to which the user is entitled access.

In step 1408, provider subsystem 102 determines a set of decryption keys associated with the set of temporally aligned media content programs to which the user is entitled access. Provider subsystem 102 may identify the associated set of decryption keys in any of the ways described herein. In certain examples, provider subsystem 102 may select decryption keys for inclusion in the set of decryption keys based on a set of channels, which is determined in step 1406, to which the user is entitled access.

In step 1410, provider subsystem 102 provides the set of decryption keys to the user device. Provider subsystem 102 may provide the set of decryption keys to the user device in any of the ways described herein.

Figure 15:
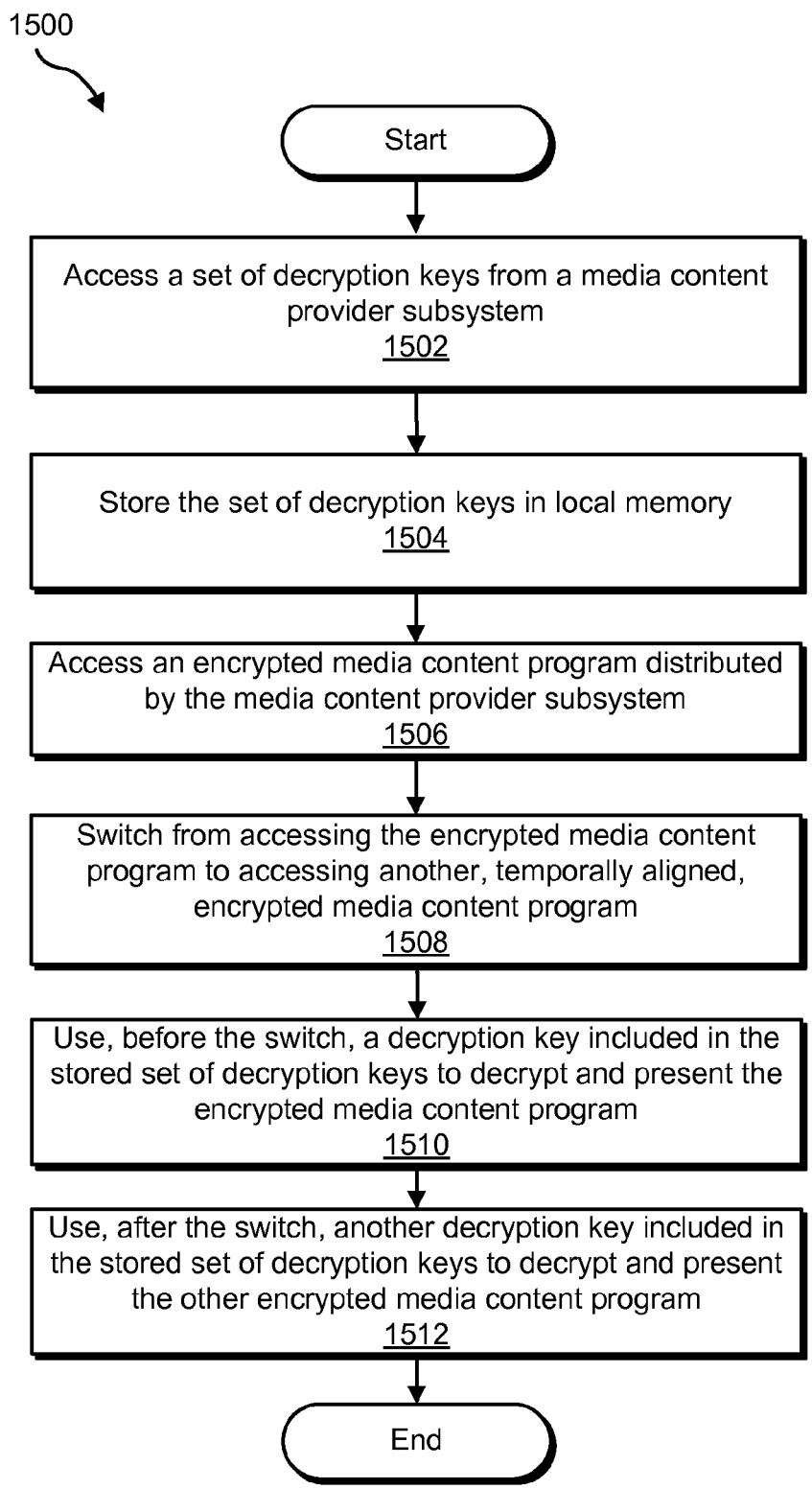

FIG. 15 illustrates an exemplary method 1500 of managing decryption keys in relation to accessing encrypted media content. While FIG. 15 illustrates exemplary steps according to certain embodiments, other embodiments may omit, add to, reorder, combine, and/or modify any of the steps shown in FIG. 15. In certain embodiments, one or more of the steps shown in FIG. 15 may be performed by access subsystem 102 and/or any user device (e.g., user device 1204) included in or implementing access subsystem 102.

In step 1502, a user device accesses a set of decryption keys from a media content provider subsystem (e.g., provider subsystem 102), such as described herein.

In step 1504, the user device stores the set of decryption keys in local memory. The local memory may include any non-transitory computer-readable medium included in the user device.

In step 1506, the user device accesses an encrypted media content program distributed by the media content provider subsystem, such as described herein.

In step 1508, the user device switches from accessing the encrypted media content program to accessing another, temporally aligned, encrypted media content program distributed by the media content provider subsystem, such as described herein. In certain examples, the user device may perform step 1508 in response to a user request provided by a user of the user device to switch from accessing the encrypted media content program to accessing the other encrypted media content program. In some examples, the user request may include an instruction to change channels from one channel to another channel.

In step 1510, the user device uses, before the switch in step 1508, a decryption key included in the stored set of decryption keys to decrypt and present the encrypted media content program, such as described herein.

In step 1512, the user device uses, after the switch in step 1508, another decryption key included in the stored set of decryption keys to decrypt and present the other encrypted media content program, such as described herein.

As described herein, the user device is able to access and use each decryption key in the locally stored set of decryption keys without having to dynamically retrieve a new decryption key from a remote source in conjunction with the switch perform in step 1508.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 16:
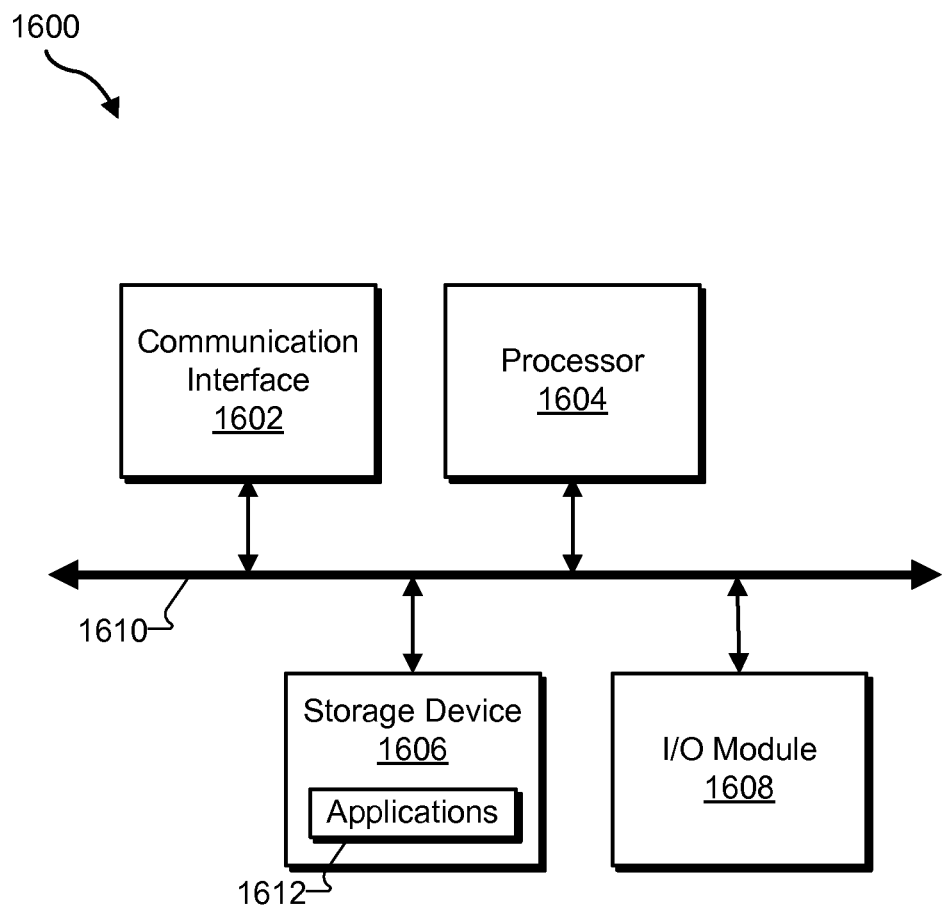
FIG. 16 illustrates an exemplary computing device according to principles described herein.

FIG. 16 illustrates an exemplary computing device 1600 that may be configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, and any other suitable interface. Communication interface 1602 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1602 may be configured to interface with any suitable communication media, protocols, and formats.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another non-transitory computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1606. For example, data representative of one or more executable applications 1612 (which may include, but are not limited to, one or more of the software applications described herein) configured to direct processor 1604 to perform any of the operations described herein may be stored within storage device 1606. In some examples, data may be arranged in one or more databases residing within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1608 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1600. For example, one or more applications 1612 residing within storage device 1606 may be configured to direct processor 1604 to perform one or more processes or functions associated with one or more of the facilities described herein. Likewise, one or more of the storage facilities described herein may be implemented by or within storage device 1606.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:
1. A method comprising:
 accessing, by a user device from a media content provider subsystem, a set of decryption keys;
 storing, by the user device, the set of decryption keys in local memory of the user device;
 accessing, by the user device, an encrypted media content program distributed by the media content provider subsystem;
 switching, by the user device, from accessing the encrypted media content program to accessing another encrypted media content program distributed by the media content provider subsystem, the another encrypted media content program temporally aligned with the encrypted media content program;

using, by the user device, a decryption key included in the set of decryption keys stored in the local memory to decrypt the encrypted media content program before the switching is performed; and using, by the user device, another decryption key included in the set of decryption keys stored in the local memory to decrypt the another encrypted media content program after the switching is performed, wherein the encrypted media content program and the another encrypted media content program are temporally aligned so as to be concurrently distributed during a same time slot.

2. The method of claim 1, further comprising:

receiving, by the user device, a user request to access the another encrypted media content program;

wherein the switching is performed by the user device in response to the user request.

3. The method of claim 2, wherein the accessing of the set of decryption keys is performed before the detecting of the user request to access the another encrypted media content program.

4. The method of claim 2, wherein the user request comprises a channel change from one television channel associated with the encrypted media content program to another television channel associated with the another encrypted media content program.

5. The method of claim 1, further comprising:

presenting, by the user device before the switching from accessing the encrypted media content program to accessing the another encrypted media content program, the decrypted media content program for experiencing by a user; and presenting, by the user device after the switching from accessing the encrypted media content program to accessing the another encrypted media content program, the decrypted another media content program for experiencing by the user.

6. The method of claim 1, wherein the accessing of the set of decryption keys is performed before the accessing of the encrypted media content program.

7. The method of claim 1, wherein the accessing of the set of decryption keys comprises downloading data representative of the set of decryption keys to the user device in a single download session.

8. The method of claim 1, wherein the set of decryption keys is specific to a temporally aligned encryption segment of the encrypted media content program and the another encrypted media content program.

9. The method of claim 8, further comprising:

accessing, by the user device from the media content provider subsystem, an additional set of decryption keys; and storing, by the user device, the additional set of decryption keys in the local memory;

wherein the additional set of decryption keys is specific to a different temporally aligned encryption segment of the encrypted media content program and the another encrypted media content program.

10. The method of claim 1, embodied as computer-executable instructions on at least one non-transitory computer-readable medium.

11. A method comprising:

encrypting, by a media content provider subsystem, a plurality of temporally aligned media content programs;

distributing, by the media content provider subsystem, an encrypted media content program included in the encrypted temporally aligned media content programs for access by a user device;

providing, by the media content provider subsystem to the user device, a set of decryption keys configured to be used by the user device to decrypt the encrypted temporally aligned media content programs; and switching, by the media content provider subsystem, from distributing the encrypted media content program to distributing another encrypted media content program included in the encrypted temporally aligned media content programs for access by the user device;

wherein the set of decryption keys includes a decryption key configured to be used by the user device to decrypt the encrypted media content program before the switching is performed and another decryption key configured to be used by the user device to decrypt the another encrypted media content program after the switching is performed; and wherein the encrypted temporally aligned media content programs are temporally aligned so as to be concurrently distributed during a same time slot.

12. The method of claim 11, further comprising:

receiving, by the media content provider subsystem from the user device, a request to access the another encrypted media content program included in the plurality of temporally aligned encrypted media content programs;

wherein the switching is performed by the media content provider subsystem in response to the request.

13. The method of claim 12, wherein the providing of the set of decryption keys to the user device is performed before the receiving of the switch request from the user device.

14. The method of claim 11, wherein the providing of the set of decryption keys to the user device comprises transmitting data representative of the set of decryption keys to the user device in a single download session.

15. The method of claim 11, further comprising:

determining, by the media content provider subsystem, a set of channels to which a user associated with the user device is entitled access; and selecting, by the media content provider subsystem, decryption keys for inclusion in the set of decryption keys based on the set of channels to which the user associated with the user device is entitled access.

16. The method of claim 11, wherein the set of decryption keys is specific to a temporally aligned encryption segment of the plurality of encrypted temporally aligned media content programs.

17. The method of claim 16, further comprising:

providing, by the media content provider subsystem to the user device, an additional set of decryption keys configured to be used by the user device to decrypt the encrypted temporally aligned plurality of media content programs;

wherein the additional set of decryption keys is specific to a different temporally aligned encryption segment of the plurality of encrypted temporally aligned media content programs.

18. The method of claim 17, wherein the providing of the additional set of decryption keys is performed in advance of the media content provider subsystem distributing the different temporally aligned encryption segment of the plurality of encrypted temporally aligned media content programs.

19. The method of claim 11, wherein each media content program included in the plurality of temporally aligned media content programs is associated with a different television channel included in a plurality of television channels.

20. The method of claim 11, further comprising:
receiving, by the media content provider subsystem, the plurality of temporally aligned media content programs from a source of live television streams, the plurality of temporally aligned media content programs comprising a plurality of temporally aligned live television programs;
capturing, by the media content provider subsystem, the plurality of temporally aligned live television programs; and
segmenting, by the media content provider subsystem, each live television program included in the plurality of temporally aligned live television programs for discrete encryption of each segment.

21. The method of claim 11, embodied as computer-executable instructions on at least one non-transitory computer-readable medium.

22. A method comprising:
encrypting, by a media content provider subsystem, a plurality of temporally aligned media content programs;
distributing, by the media content provider subsystem, at least one of the encrypted temporally aligned media content programs for access by a user device;
determining, by the media content provider subsystem, a set of temporally aligned media content programs included in the plurality of temporally aligned media content programs to which a user associated with the user device is entitled access;
determining, by the media content provider subsystem, a set of decryption keys associated with the set of temporally aligned media content programs to which the user associated with the user device is entitled access; and
providing, by the media content provider subsystem, the set of decryption keys to the user device;
wherein the set of decryption keys includes a distinct decryption key for each encrypted media content program included in the set of encrypted temporally aligned media content programs, each distinct decryption key configured to be used by the user device to decrypt the corresponding encrypted media content program included in the set of encrypted temporally aligned media content programs, and
wherein the plurality of temporally aligned media content programs are temporally aligned so as to each be concurrently distributed during a same time slot.

23. A system comprising:
a media content provider subsystem that:
encrypts a plurality of temporally aligned media content programs,
distributes at least one of the encrypted temporally aligned media content programs over a network, and
provides a set of decryption keys configured to be used to decrypt the encrypted temporally aligned media content programs, wherein the set of decryption keys includes a distinct decryption key for each encrypted media content program included in the plurality of encrypted temporally aligned media content programs; and
a media content access subsystem configured to communicate with the media content provider subsystem by way of the network and that:
accesses and stores, in local memory, the set of decryption keys provided by the media content provider subsystem,
accesses an encrypted media content program included in the at least one of the encrypted temporally aligned media content programs distributed by the media content provider subsystem over the network,
uses a decryption key included in the set of decryption keys stored in local memory to decrypt the encrypted media content program, and
presents the decrypted media content program for experiencing by a user,
wherein the plurality of encrypted temporally aligned media content programs are temporally aligned so as to each be concurrently distributed during a same time slot.

24. The system of claim 23, wherein the media content access subsystem:
switches from accessing the encrypted media content program to accessing a different encrypted media content program included in the plurality of temporally aligned media content programs and distributed by the media content provider subsystem,
uses a different decryption key included in the set of decryption keys stored in local memory to decrypt the different encrypted media content program, and
presents the decrypted different media content program for experiencing by the user.

25. A method comprising:
accessing, by a user device from a media content provider subsystem, a set of decryption keys;
storing, by the user device, the set of decryption keys in local memory of the user device;
accessing, by the user device, a first encrypted media content program distributed by the media content provider subsystem by way of a first channel;
switching, by the user device, from accessing the first encrypted media content program to accessing a second encrypted media content program distributed by the media content provider subsystem by way of a second channel, the second encrypted media content program temporally aligned with the first encrypted media content program so as to be concurrently distributed during a same time slot;
using, by the user device, a decryption key included in the set of decryption keys stored in the local memory to decrypt the first encrypted media content program before the switching is performed; and
using, by the user device, another decryption key included in the set of decryption keys stored in the local memory to decrypt the second encrypted media content program after the switching is performed.

* * * * *